Dec. 7, 1954     E. H. BORN ET AL     2,696,189
VOLUME INDICATOR FOR HYDRAULIC PUMPS

Filed March 20, 1951     2 Sheets-Sheet 1

INVENTORS
*Ellis H. Born*
*Edward M. McCullough*
*Leroy E. Bonnette*

*Herschel C. Omohundro*
attorney

Dec. 7, 1954  E. H. BORN ET AL  2,696,189
VOLUME INDICATOR FOR HYDRAULIC PUMPS
Filed March 20, 1951  2 Sheets-Sheet 2
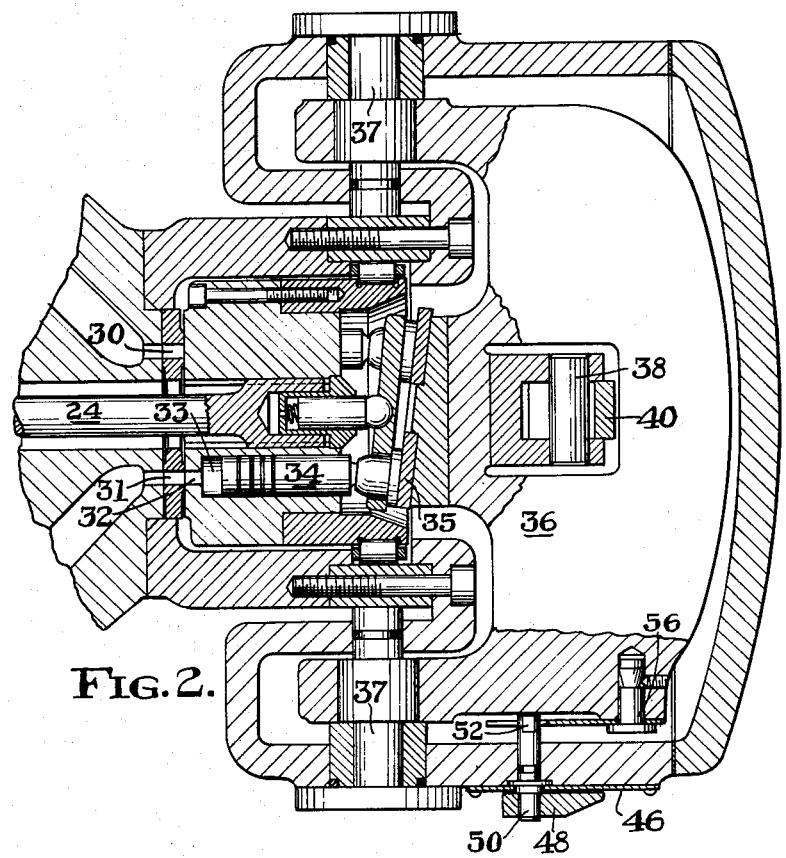
FIG.2.
FIG.3.  FIG.4.
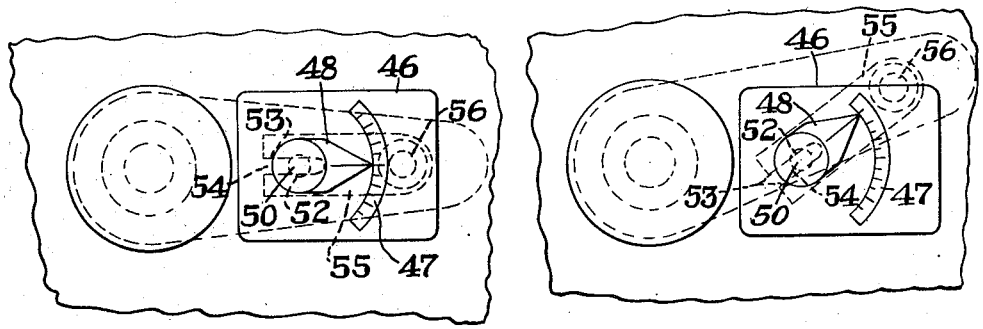
INVENTORS
Ellis H. Born
Edward M. McCullough
Leroy E. Bonnette
Herschel C. Omohundro
attorney

United States Patent Office 2,696,189
Patented Dec. 7, 1954

2,696,189

VOLUME INDICATOR FOR HYDRAULIC PUMPS

Ellis H. Born and Edward M. McCullough, Columbus, and Leroy E. Bonnette, Delaware, Ohio, assignors to The Denison Engineering Company, Columbus, Ohio Application March 20, 1951, Serial No. 216,632

5 Claims. (Cl. 116—124)

This invention relates generally to hydraulics and more particularly to fluid pressure energy translating devices. Still more particularly the invention relates to variable volume fluid pumps and motors and means for visibly indicating the volume settings of such devices.

This application is a continuation-in-part of our application Serial No. 121,526, filed October 15, 1949, entitled Hydraulic Pump or Motor.

An object of this invention is to provide a simple indicating device for a variable volume pump or motor which will show even slight changes in volume.

Another object is to provide an indicating device for a variable volume axial piston type of fluid pump or motor having a movable volume changing member, the indicating device having a pointer element and a motion multiplying transmission means between the movable volume changing member and the pointer whereby the latter will be moved a greater distance than the former.

Still another object of the invention is to provide a variable volume pump or motor having a volume changing member mounted for pivotal movement about an axis and a pointer also mounted for pivotal movement about an axis spaced from the axis of movement of the volume changing member, the pointer and the volume changing member being connected by a link so that the movement of a point on such member spaced a greater distance from its pivotal axis than the axis of the pointer will be transmitted to the pointer thus causing the latter to pivot through a greater angle than the volume changing member hus rendering the indication more apparent.

A further object of the invention is to provide a fluid pump or motor having a volume changing member mounted for pivotal movement and to provide such member with a pivot which swings with the member, a pointer being mounted for pivotal movement about a stationary axis disposed between the axis of movement of the volume changing member and the pivot provided on such member, the latter pivot being connected by a link with the pivot for said pointer whereby the pointer will be caused to rock through a greater angle than the volume changing member even though it is moved thereby.

Further objects and advantages of the present invention will be apparent from the following description, reference being had to the accompanying drawings wherein a preferred form of embodiment of the invention is clearly shown.

In the drawings:

Fig. 2 is a detail horizontal sectional view taken through the pump or motor shown in Fig. 1 on the planes indicated by the line II—II of Fig. 1.

Figs. 3 and 4 are fragmentary side elevational views showing the indicating mechanism forming the subject matter of the present invention in different stages of operation.

Figure 1:
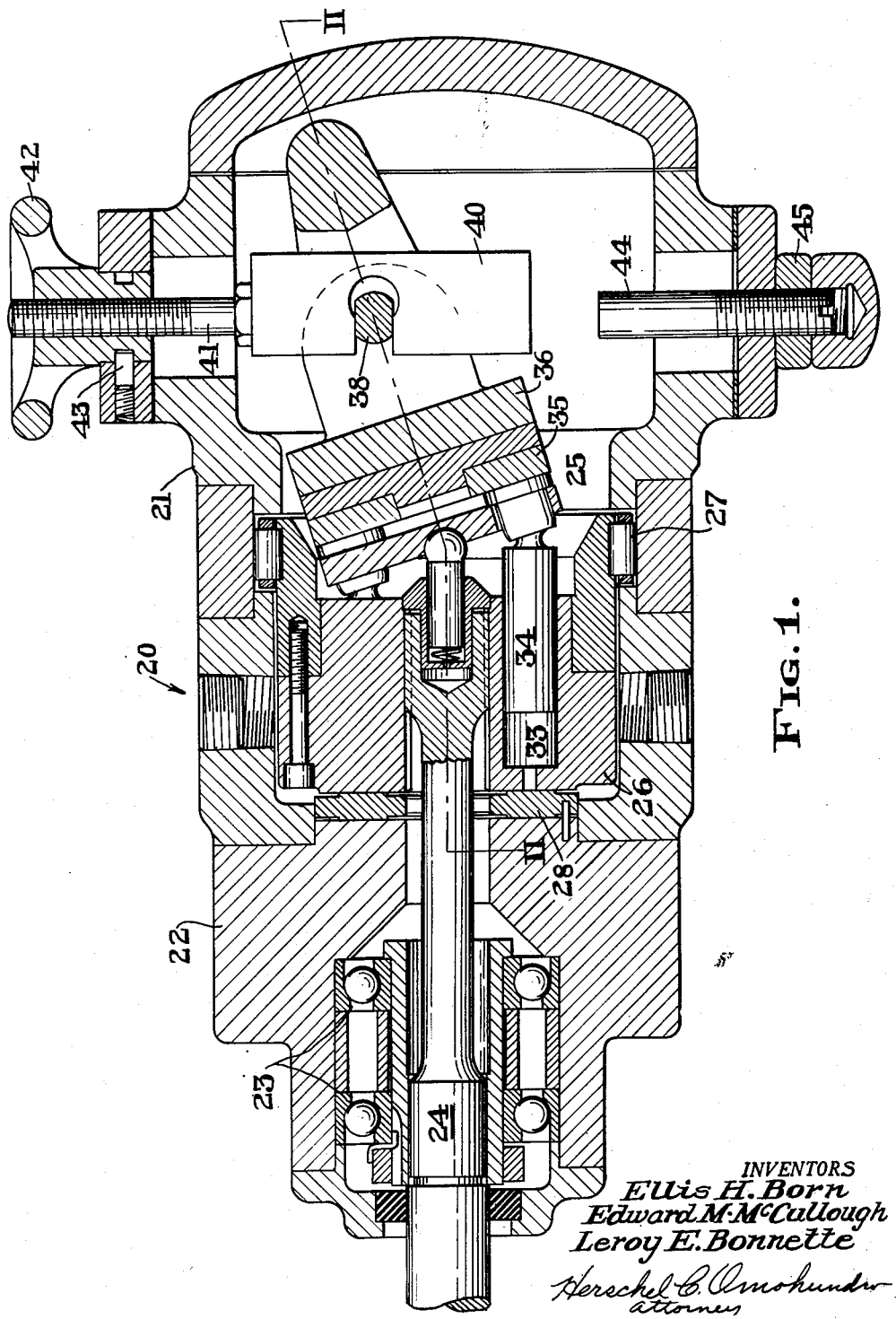
Fig. 1 is a longitudinal sectional view taken through a variable volume axial piston type of fluid pump or motor formed in accordance with the present invention.

Referring more particularly to the drawings the numeral 20 designates generally the axial piston pump to which the indicating mechanism forming the subject matter of the invention has been applied. It should be obvious that the indicating mechanism is applicable to other types of pumps or motors the only requirement being that such devices have a movable member for varying the volume. The pump 20 is identical with that shown in the previously mentioned co-pending application and a general description only will be given herein.

The pump includes a casing 21 having an inlet head 22 in which anti-friction bearings 23 support for rotation a shaft 24; this shaft extends into a chamber 25 formed in the casing and is suitably connected with a cylinder barrel 26 also supported for rotary movement by bearings 27. Between the cylinder barrel and the head 22 there is provided a valve plate 28 this plate having inlet and outlet ports 30 and 31. These ports are disposed for communication with cylinder ports 32 formed in the cylinder barrel and connected with cylinders 33 which receive pistons 34, the pistons being reciprocated in the cylinders upon rotation of the cylinder barrel to effect the pumping operation. This reciprocation of the pistons is caused by an inclined cam or swash plate 35 which is carried by a hanger 36, the latter being mounted for pivotal movement on pins 37. The angularity of the cam or swash plate 35 may be varied to change the volume of fluid drawn into and expelled from the cylinders 33 through the movement of the hanger 36 about the axis formed by the pins 37 these pins being disposed in alignment to provide the axis about which the hanger is intended to move.

The hanger is provided with a cross pin 38 for engagement by a slotted block 40 which is connected to the lower end of a threaded stud 41. This stud is connected by its threads with a hand-wheel 42 having a swiveled connection 43 on the casing 22. It will be clear from Fig. 1 that as the handwheel 42 is revolved the screw 41 will move longitudinally in the hub of the hand-wheel this movement being imparted to the block 40 and pin 38. Since this pin is mounted in the hanger 36, similar movement will be imparted thereto. When this hanger moves the angularity of the swash plate 35 relative to the longitudinal axis of the shaft 24 will be changed. In one position of adjustment of the hand-wheel the longitudinal axis of the hanger at right angles to the face of the swash plate 35 will be disposed in alignment with the axis of rotation of the shaft 24. When the hanger is in this postion the face of the swash plate will be normal to the axis of the shaft and cylinder barrel and no movement will be imparted to the pistons.

Stop member 44 is provided in the casing 21 to limit the movement of the hanger in a downward direction with its axis in alignment with the axis of the shaft. This position of the hanger is termed a zero volume position. The stop member 44 in this instance comprises a threaded rod which is received by the casing and is locked in adjusted positions by the lock nut 45. The hanger is shown in approximately full volume position in Fig. 1. In this position the maximum angle between the cam or swash plate 35 and the axis of the shaft and cylinder barrel is secured.

This invention is directed to a mechanism for indicating the positions of adjustment of the hanger 36 and consequently the volume of the pump. This mechanism is shown in section in Fig. 2 and in side elevation in two positions of operation in Figs. 3 and 4. The mechanism comprises an indicating plate 46 which is secured to the outer side of the casing 21 and is provided with a graduated scale 47. A pointer 48 is fastened to a shaft 50 which is journaled in the casing 21 at one side of the axis of the fulcrum pins 37. This shaft 50 extends into the chamber in the casing 21 and has its inner end provided with flat surfaces 52 which engage the sides 53 of a slot 54 formed in a link 55. This slot 54 is disposed at one end of the link, the opposite end thereof being pivotally connected as at 56 to the hanger 36. The point at which the pivotal connection 56 is made is disposed a greater distance from the axis of the pins 37 than the distance between this axis and the shaft 50. From a comparison of Figs. 3 and 4 it will be obvious that when the hanger 36 is adjusted to vary the volume of the pump, the point at which the connection 56 is disposed will move through an angle about the axis of the pins 37. Due to the connection between the pivot 56 and the shaft 50 the movement of the hanger will be transmitted to the shaft, however, since the shaft 50 is disposed between the axis of movement of the hanger and the pivot 56 the shaft will be revolved through a greater angle than that through which the hanger is rocked. Since the pointer 48 is fixed to the shaft 50, it will thus be caused to move through the same angle as the shaft 50 and give a multiplied indication of the movement. It will thus be seen that even minute motion on the part of the hanger will be shown by the indicating mechanism. The scale on the plate 46 may be suitably marked to inform the operator either in parts of the entire capacity of the pump or in gallons per minute as to the setting of the volume varying mechanism.

While but a single form of the invention has been illustrated it should be obvious that many minor changes may be made in the construction and relation of parts without affecting the method of indication secured thereby.

While the form of embodiment of the present invention as herein disclosed constitutes a preferred form, it is to be understood that other forms might be adopted, all coming within the scope of the claims which follow.

We claim:

1. In a variable volume fluid pressure energy translating device of the type having a pivoted member for changing the volume, means for indicating the volume comprising an indicator disposed for pivotal movement about an axis extending substantially parallel to and eccentrically located with respect to the axis of the pivoted member of the volume changing mechanism; and a motion transmitting element connecting the pivot for said indicator with the pivoted member of the volume changing mechanism, the point of connection of said motion transmitting element and said volume changing mechanism and the pivot for the latter being disposed on opposite sides of the axis for said indicator.

2. In a variable volume fluid pressure energy translating device of the type having a pivoted member for changing the volume, means for indicating the volume comprising an indicator mounted for pivotal movement in spaced relation to the pivotal axis of the volume changing member; and a member for transmitting motion from said volume changing member to the pivot for said indicator, said member having a plate pivoted on the volume changing member at a point spaced from the axis thereof a greater distance than the pivot for said indicator, said plate having a motion transmitting connection with said indicator pivot.

3. In a variable volume fluid pressure energy translating device of the type having a casing and a volume changing member pivoted in said casing, means for indicating the volume comprising a shaft pivoted in said casing at one side of the axis of pivotal movement of said volume changing member; a pointer secured to said shaft on the outer side of said casing; a link having a rotary motion transmitting connection with the inner end of said shaft, said plate being pivotally connected to said volume changing member, the point of connection of said plate and volume changing member being spaced from the pivotal axis of the latter a greater distance than the axis of said shaft.

4. In a variable volume fluid pressure energy translating device of the type having a casing and a volume changing member pivoted in said casing, means for indicating the volume comprising an indicator dial on said casing; a shaft pivoted in said casing at one side of the axis of pivotal movement of said volume changing member; a pointer secured to the outer end of said shaft for movement over said dial; a link having a rotary motion transmitting connection with the inner end of said shaft; and means pivotally connecting said link to said volume changing member, the distance from the pivotal axis of said volume changing member to the axis of said shaft being less than the distance from the former axis to the point of connection of said link and volume changing member.

5. In a variable volume fluid pressure energy translating device, a volume changing member mounted for pivotal movement about an axis; means for indicating the position of said volume changing member having a pointer mounted for pivotal movement about an axis disposed in the same plane as the axis of pivotal movement of said volume changing member; and a motion transmitting member connecting a point on said volume changing member, movable at right angles to said plane when said member is moved, with said pointer, the point of connection on said volume changing member being spaced a greater distance from the pivotal axis thereof than the pivotal axis of said pointer.

References Cited in the file of this patent

UNITED STATES PATENTS

| Number | Name | Date |
| --- | --- | --- |
| 1,632,304 | Maurer | June 14, 1927 |
| 1,810,355 | Kingsford | June 16, 1931 |
| 2,146,133 | Tweedale | Feb. 7, 1939 |
| 2,307,719 | Hawley | Jan. 5, 1943 |
| 2,465,510 | Bonnafe | Mar. 29, 1949 |
| 2,487,617 | Tweedale | Nov. 8, 1949 |
| 2,565,287 | Willson | Aug. 21, 1951 |